(12) United States Patent
Beard et al.

(10) Patent No.: US 6,537,453 B2
(45) Date of Patent: Mar. 25, 2003

(54) ACID-NEUTRALIZING FILTER

(75) Inventors: John H. Beard, Kearney, NE (US); Allan Roush, Thorntown, IN (US)

(73) Assignee: Baldwin Filters, Inc., Kearney, NE (US)

( * ) Notice: Subject to any disclaimer, the term of this patent is extended or adjusted under 35 U.S.C. 154(b) by 0 days.

(21) Appl. No.: 09/859,549

(22) Filed: May 17, 2001

(65) Prior Publication Data

US 2002/0185453 A1 Dec. 12, 2002

(51) Int. Cl.$^7$ .............. B01D 27/00; B01D 35/00; F01M 1/00; C10M 125/10
(52) U.S. Cl. ............ 210/206; 210/168; 210/209; 210/501; 123/196 A; 184/6.24
(58) Field of Search ................ 210/205, 209, 210/206, 168, 501; 123/196 A; 184/6.21, 6.24

(56) References Cited

U.S. PATENT DOCUMENTS

| | | |
|---|---|---|
| 1,914,999 A | 6/1933 | Maverick et al. |
| 2,537,992 A | 1/1951 | Gross et al. |
| 2,843,268 A | 7/1958 | Kennedy |
| 3,005,555 A | 10/1961 | Bosworth |
| 3,529,719 A | 9/1970 | Graybill |
| 4,075,097 A * | 2/1978 | Paul |
| 4,075,098 A | 2/1978 | Paul et al. |
| 4,324,660 A | 4/1982 | Peyton et al. |
| 4,336,042 A | 6/1982 | Frantz et al. |
| 4,501,660 A | 2/1985 | Hebert |
| 4,557,829 A | 12/1985 | Fields |
| 4,655,914 A | 4/1987 | Wada |
| 4,733,449 A | 3/1988 | Spearman |
| 4,751,901 A * | 6/1988 | Moor |
| 4,802,979 A | 2/1989 | Medley, III |
| 4,832,836 A | 5/1989 | Selsdon |
| 4,872,976 A | 10/1989 | Cudaback |
| 4,906,389 A | 3/1990 | Brownawell et al. |
| 4,946,485 A | 8/1990 | Larsson |
| 5,042,617 A | 8/1991 | Brownawell et al. |
| 5,049,269 A * | 9/1991 | Shah |
| 5,068,044 A | 11/1991 | Brownawell et al. |
| 5,069,799 A | 12/1991 | Brownawell et al. |
| 5,078,877 A | 1/1992 | Cudaback et al. |
| 5,112,482 A | 5/1992 | Shaub et al. |
| 5,180,490 A | 1/1993 | Eihusen et al. |
| 5,225,081 A | 7/1993 | Brownawell et al. |
| 5,236,595 A | 8/1993 | Wang et al. |
| 5,342,511 A | 8/1994 | Brown et al. |
| 5,447,627 A | 9/1995 | Loafman et al. |
| 5,459,074 A * | 10/1995 | Muoni |
| 5,490,930 A | 2/1996 | Krull |
| 5,525,226 A | 6/1996 | Brown et al. |
| 5,527,452 A | 6/1996 | Grigoriev et al. |
| 5,538,542 A | 7/1996 | Watanabe et al. |
| 5,538,543 A | 7/1996 | Watanabe et al. |
| 5,562,746 A | 10/1996 | Raether |
| 5,622,544 A | 4/1997 | Shamine et al. |
| 5,695,637 A | 12/1997 | Jiang et al. |
| 5,702,602 A | 12/1997 | Brown et al. |
| 5,718,258 A * | 2/1998 | Lefebvre et al. |
| 5,718,743 A | 2/1998 | Donnelly et al. |
| 5,738,785 A | 4/1998 | Brown et al. |
| 5,779,772 A | 7/1998 | Unger et al. |
| 5,792,245 A | 8/1998 | Unger et al. |
| 5,851,269 A | 12/1998 | Strope |
| 5,888,383 A | 3/1999 | Cox |
| 5,903,357 A | 5/1999 | Demirdogen et al. |
| 5,906,736 A | 5/1999 | Bounnakhom et al. |
| 5,996,810 A | 12/1999 | Bounnakhom et al. |
| 6,045,693 A | 4/2000 | Miller et al. |

FOREIGN PATENT DOCUMENTS

| | | |
|---|---|---|
| EP | 0 287 527 A2 | 10/1988 |
| GB | 507064 | 6/1939 |
| GB | 836993 | 6/1960 |
| WO | WO 86/03687 A1 | 7/1986 |

* cited by examiner

Primary Examiner—Thomas M. Lithgow
(74) Attorney, Agent, or Firm—Leydig, Voit & Mayer, Ltd

(57) ABSTRACT

The present invention provides a filter apparatus for use in removing impurities and acids contained in a fluid that includes a particulate filter and an acid-neutralizing filter. The particulate filter and the acid-neutralizing filter may be positioned within separate housings or they may be positioned within a common housing. The acid-neutralizing filter contains an acid-neutralizing compound such as crushed limestone, calcium carbonate or magnesium carbonate.

30 Claims, 8 Drawing Sheets

ACID-NEUTRALIZING FILTER

FIELD OF THE INVENTION

This invention pertains to filtering and treating systems for lubricating systems. More particularly, the invention relates to an oil filtering and treating system for the removal of impurities and acids from the oil system of a gasoline or diesel engine.

BACKGROUND OF THE INVENTION

Heavy-duty diesel engine life, or time to rebuild, has historically been linked directly to piston ring, cylinder liner or crankshaft bearing life. Engine design parameters require that these engine components be hydrodynamically lubricated, i.e., operate with a film of lubricant separating these engine components from associated metal surfaces. Consequently, the principle mechanism associated with piston rings, cylinder liners and crankshaft journal bearings wear is not metal-to-metal contact or frictional wear. The primary diesel engine wear mode influencing engine life is corrosive wear caused by sulfur and nitrogen containing acids formed during the diesel fuel combustion process. One estimate is that more than 70 percent of heavy-duty diesel engine wear is caused by combustion acid metal corrosion.

Control of diesel engine corrosive wear has historically been accomplished through inclusion of basic or alkaline chemicals within the engine oil that is utilized to form the hydrodynamic lubricant film. These alkaline components rapidly neutralize or solubilize combustion acids upon contact with the acid molecules. The effectiveness of the corrosive wear control is entirely dependent upon the probability of the acid being neutralized by alkaline oil components prior to contact of the acid with engine metal surfaces resulting in corrosive wear. The amount of engine corrosive wear can typically be monitored through the use of oil analysis where cylinder liner wear is associated with iron parts per million (ppm) level in the engine oil. Piston ring wear is monitored by chromium levels and crankshaft bearing wear is reflected by lead levels in the oil.

The corrosive wear process begins in the diesel engine combustion chamber where the hydrocarbon diesel fuel containing sulfur compounds is combusted in the presence of oxygen and nitrogen. The hydrocarbon fuel is converted to principally carbon dioxide and water, creating extremely high gas pressures, which push down on the top of the piston to produce engine power. Also produced are $SO_x$ and $NO_x$ compounds, which rapidly react with the water released during fuel combustion yielding primarily sulfuric acid and nitric acid. These acids reach engine metal surfaces by direct contact in the cylinder bore or as blow-by gases as a normal part of engine operation. The hydrodynamic lubricant film present in the piston ring belt zone will also transport acid molecules throughout the engine as the lubricant is constantly circulated.

Combustion acid neutralization is completed using a simple acid-base reaction where metal carbonates carried as alkaline components within the lubricant directly react with sulfuric and nitric acids. The effectiveness of corrosive wear control is totally dependent upon the probability of these metal carbonates coming in contact with the acid molecules before these same molecules contact engine metal surfaces. Another factor influencing the rate and efficiency of acid neutralization is acid solubilization within the lubricant by another oil additive classified as an ashless dispersant. Dispersants are long chain hydrocarbon polymers, which are functionalized by terminating the polymer chain with a functional group generally containing basic nitrogen. Dispersants will rapidly complex with combustion acids dispersing or solubilizing them within the lubricant for transportation to a metal carbonate where the acid is converted to a neutral metallic salt. The combined efficiency of dispersant acid complexing and metallic carbonate acid neutralization controls the rate of engine wear.

Overbased or alkaline metallic detergents have been widely utilized as metallic carbonate carriers in diesel engine oil compositions. Calcium and magnesium sulfonates and phenates account for the majority of the detergents utilized to formulate diesel engine oils. Overbased detergents are produced by incorporating extra calcium or magnesium within a physical structure called a detergent micelle. For example, alkylbenzenesulfonic when reacted with calcium hydroxide and blown with carbon dioxide during the reaction process will produce an overbased calcium sulfonate. The extra metal or calcium present in the detergent micelle structure is calcium carbonate surrounded by oil solubilizing calcium sulfonate detergents. This physical structure circulating within the oil delivers the calcium carbonate to the combustion acid molecules for acid neutralization.

Ideally, there should be no limit to the amount of alkaline detergent incorporated within a diesel engine oil formulation; however, in reality, modem diesel engines can only tolerate a limited level of metallic detergents before metallic ash deposits cause piston ring sticking and exhaust valve guttering. These ash deposits are caused by pyrolysis of oil metal organo compounds, principally calcium and magnesium detergents.

Recognizing (1) most diesel engine wear is caused by acid corrosion, (2) the lubricant ash content is limited, and (3) newer diesel engine designs will incorporate exhaust gas recirculation where combustion acids will be concentrated and reintroduced into the engine, a system capable of neutralizing combustion acids without significantly altering diesel engine oil compositions would significantly reduce corrosive wear. This is especially true in the later half of an oil drain period when the lubricant's acid-neutralizing capability has been depleted.

BRIEF SUMMARY OF THE INVENTION

The present invention is directed to a system for extending the normal operating life of a fluid circulation system such as an oil circulation system associated with a diesel engine. The system includes an apparatus for assisting in the removal of acids which accumulate in the fluid, such as an oil, that is pumped through the circulation system. By removing such acids, the useful life of the circulating fluid may be extended thus lowering the operating costs. Preferably, the system of the invention includes a canister through which some or all of the circulating fluid passes. Within the canister is an acid-neutralizing compound which reacts with the acids in the circulating fluid to neutralize the acids. Preferably, once the fluid circulates through the acid-neutralizing compound, the oil passes through a particulate filter prior to returning to the oil circulation system.

The apparatus for removing acids may be inserted into the full flow portion of the fluid circulation system or may be inserted into a bypass system. In either case, from a small portion up to all of the fluid being circulated may pass through the acid-neutralizing apparatus depending upon the desired acid neutralization rate.

An acid-neutralizing canister for an oil circulation system is provided according to the present invention. Preferably, the canister is a spin-on canister although other means of attachment may be used such as a bolt-on system. The canister includes an outer canister shell, an inner shell, a base plate and a spring to maintain the material in the inner shell in compression when the canister is assembled. More particularly, the canister may include a base plate, a canister shell having a closed end, an open end and a generally cylindrical sidewall therebetween, and an edge of the cylindrical sidewall secured to the base plate at the open end, an inner shell, and an acid-neutralizing compound in the inner shell for neutralizing acids in the oil circulated between an inner shell central port and inner shell peripheral ports.

The spin-on canister base plate according to the invention may include a central hub, an outer peripheral rim surrounding the hub, and a plurality of radially extending ribs connecting the hub and the rim. The base plate hub preferably defines a threaded central opening for spin-on connection to the oil system. Preferably, the central threaded opening of the base plate provides a central port for fluid returning to the oil circulation system and the peripheral ports defined between the hub, the ribs and the peripheral rim provide for fluid entering the filter from the oil circulation system. Also, preferably, the base plate is secured to the edge of the sidewall by an annular hem and the base plate defines an external annular gasket groove surrounding the inlet and outlet ports for receiving a ring gasket.

Preferably, the acid-neutralizing compound contained within the inner shell is selected from the group consisting of crushed limestone, calcium carbonate, and magnesium carbonate. Also, preferably, the acid-neutralizing compound substantially fills the inner shell.

In addition, the oil flowing through the inner shell preferably follows a first flow passage through the acid-neutralizing compound in a first axial direction, and a second flow passage through the acid-neutralizing compound in a second axial direction which is preferably established by a baffle plate which is slidable into the inner shell. The inner shell may also contain flow distribution inserts to evenly distribute the oil across the acid-neutralizing compound.

Also provided is a replaceable acid-neutralizing canister for an oil circulation system, comprising:

a housing including an outer shell and a base plate, the outer shell including an open end, a closed end and a tubular sidewall therebetween, the base plate connected to the shell at the open end, the base plate having an inlet port for receipt of oil and an outlet port for return of oil;

an acid-neutralizing compound contained within an inner shell positioned in the housing adapted to neutralize acids in the oil flowing through the compound; and a particulate filter through which the acid-neutralized oil passes prior to returning to the oil circulation system, the particulate filter being contained within the inner shell.

The replaceable acid-neutralizing canister particulate filter preferably includes first and second end-caps sealingly engaging filter media trapped between the end caps. Also, each end-cap includes an inward facing u-shaped channel adapted to receive an o-ring seal. The o-rings effect a seal between the particulate filter and a central conduit which is surrounded by the particulate filter. To permit treated and filtered oil to pass through the particulate filter and into the conduit, one or more inlet ports are provided which pass through the wall of the conduit in an area encompassed between the o-rings.

Also provided is a spin-on acid-neutralizing canister for an oil circulation system, comprising:

a housing including a canister and a base plate, the canister having an open end, a closed end, and a generally cylindrical sidewall therebetween, the base plate having a central threaded opening for mounting the acid-neutralizing canister to the oil circulation system about an axis, the base plate connected to the outer canister at the open end and defining inlet and outlet ports for communicating oil with the oil circulation system, one of the inlet or outlet ports being provided by the threaded opening;

an internal acid-neutralizing compound inner shell in the canister;

an acid-neutralizing compound substantially filling the inner shell, the inner shell adapted to receive oil and return oil;

the inner shell further containing a baffle defining an oil passageway such that the oil entering the inner shell flows through the acid-neutralizing compound in a first axial direction, and then flows in a second axial direction.

Also provided according to the present invention is a spin-on acid-neutralizing canister for an oil circulation system, comprising:

an outer canister having an open end, a closed end, and a generally cylindrical sidewall therebetween;

a base plate connected to the outer canister at the open end, the base plate defining a threaded central opening providing a central port and a plurality of peripheral ports;

an inner shell including a base and a tubular sidewall extending from the base, the inner shell having a base proximate the base plate, the base including apertures in communication with the central port;

a particulate acid-neutralizing compound substantially filling inner shell;

a baffle plate slidable in the inner shell container;

a spring positioned between the inner closed end of the outer canister and the outer closed end of the inner shell; and an oil passageway through the inner shell such that the oil flowing through the inner shell contacts the acid-neutralizing compound.

The present invention also contemplates a method of removing acids from oil in an oil circulation system comprising:

passing the oil into a canister through inlet ports in a base plate and into an annular area surrounding an inner shell contained with the canister;

passing the oil in the annular area into the inner shell;

passing the oil through an acid-neutralizing compound contained within the inner shell;

returning the treated oil to the oil circulation system.

According to the method of the present invention, the oil being treated may also pass through a particulate filter after passing through the acid-neutralizing compound but prior to returning to the oil circulation system. Preferably, when practicing the method, the acid-neutralizing compound is selected from the group consisting of crushed limestone, calcium carbonate and magnesium carbonate.

A particulate filter is also provided which comprises filter media trapped between two end caps. Each end-cap includes an inward facing u-shaped channel adapted to receive an o-ring seal. The o-ring seals are positioned to effect a seal between the particulate filter and any central conduit passing through the center of the particulate filter.

Other objects and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The present invention is directed to a system for extending the normal operating life of a fluid circulation system such as an oil circulation system associated with a diesel engine. The system includes an apparatus for assisting in the removal of acids which accumulate in the fluid, such as an oil, that is pumped through the circulation system. By removing such acids, the useful life of the circulating fluid may be extended thus lowering the operating costs. For instance, with acid-neutralization as contemplated by the present invention, mileage on a diesel engine used to propel a typical diesel truck may be extended up to a total of 100,000 miles or more between oil changes. This interval is especially important in such systems where the fluid circulation system may contain as much as 50 gallons of oil.

Preferably, the system of the invention includes a canister through which some or all of the circulating fluid passes. Within the canister is an acid-neutralizing compound which reacts with the acids in the circulating fluid to neutralize the acids. Preferably, once the fluid circulates through the acid-neutralizing compound, the oil passes through a particulate filter prior to returning to the oil circulation system.

The apparatus for removing acids may be inserted into the full flow portion of the fluid circulation system or may be inserted into a bypass system. In either case, from a small portion up to all of the fluid being circulated may pass through the acid-neutralizing apparatus depending upon the desired acid neutralization rate.

Figure 1:
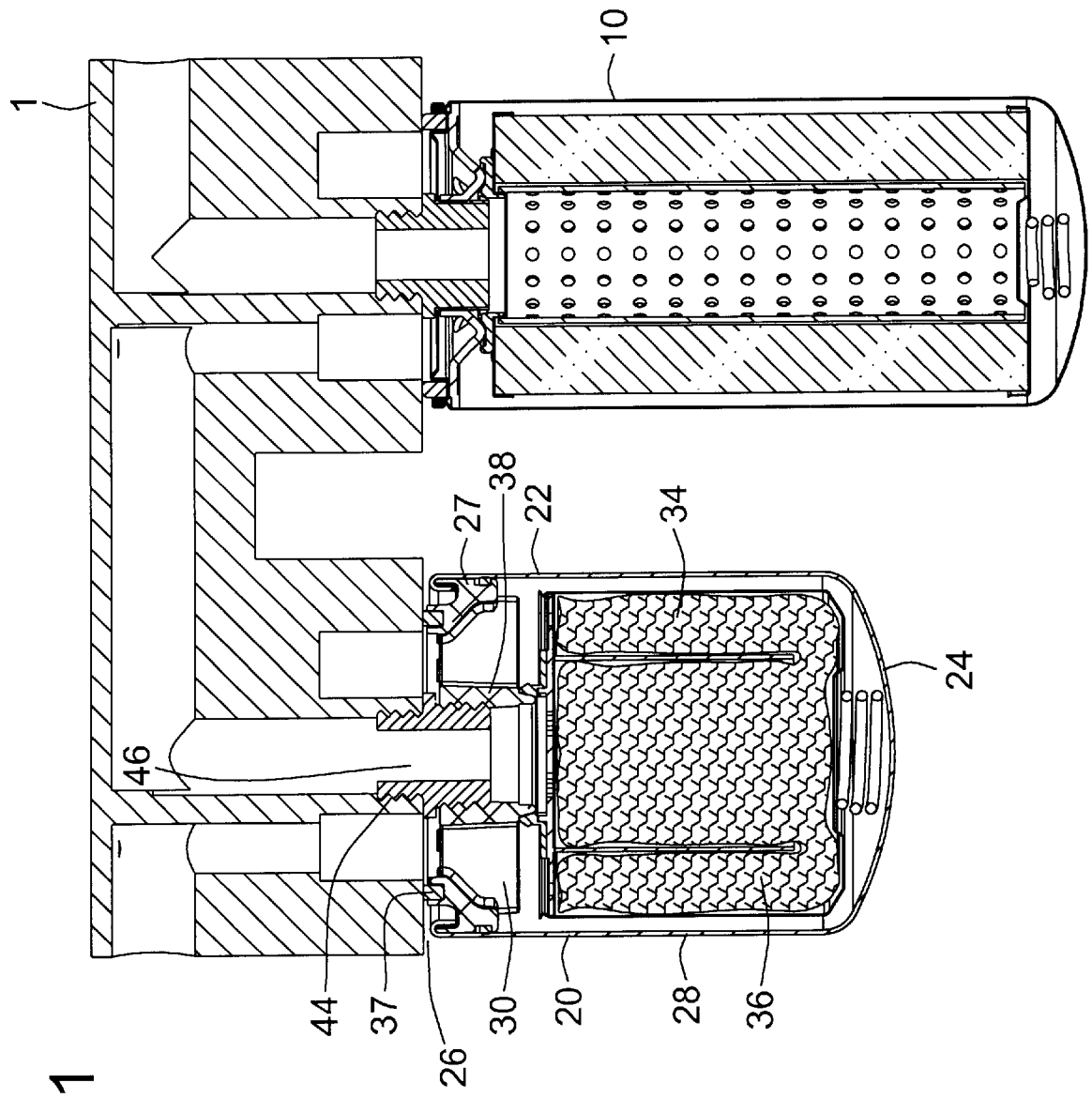
FIG. 1 is a cross-sectional view of a portion of a fluid circulation system such as an oil circulation system including a conventional particulate filter and an acid-neutralizing filter of the invention.

Referring to FIG. 1, a portion of an oil circulating system 1 is illustrated. The circulating system includes a typical particulate filter 10, and an acid-neutralizing canister 20 in accordance with the present invention.

Figure 2:
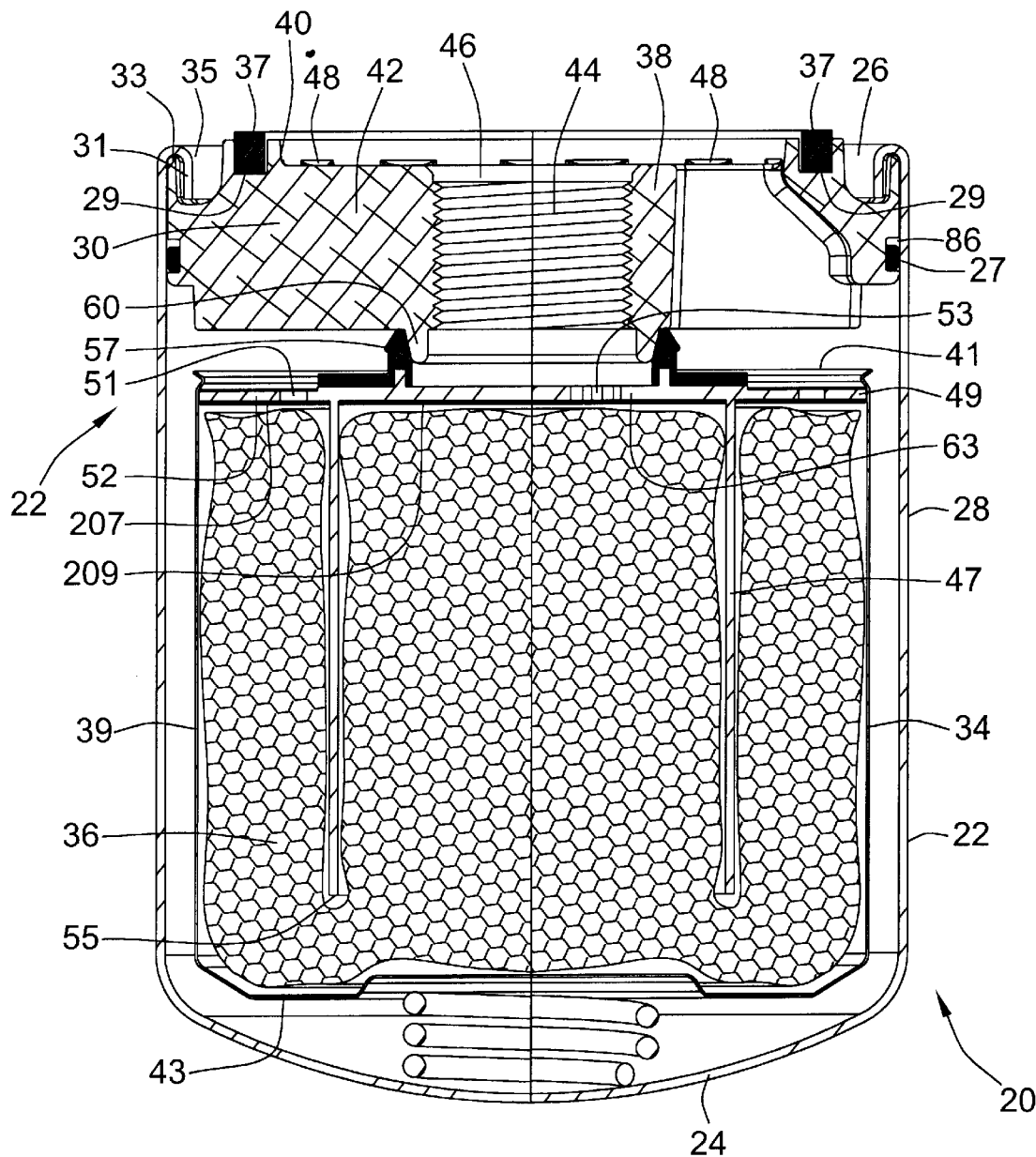
FIG. 2 is an enlarged cross-sectional view of the acid-neutralizing filter of FIG. 1.

As shown, oil first enters and passes through the acid-neutralizing canister 20 and then through the particulate filter 10. In this manner, solid particles passing out of the acid-neutralizing canister are removed from the fluid by the particulate filter 10. Alternatively, the fluid may first pass through the particulate filter and then enter the acid-neutralizing canister. In this manner, particulates do not foul the acid-neutralizing media. As seen in FIGS. 1 and 2, the acid-neutralizing canister 20 includes an outer shell in the form of an outer canister 22 which may be drawn from relatively heavy gauge steel to include a closed end 24, an open end 26 and a substantially cylindrical sidewall 28. A base plate 30 is secured to the open end 26 of the canister 22 to generally enclose the internal filter components and provide for connection to an oil circulation system, such as for example, that of a vehicular oil system such as found in a diesel truck engine (not shown). Alternatively, depending upon the desired strength and service conditions, the outer canister may be formed from any other suitable material including plastics and aluminum.

Figure 3:
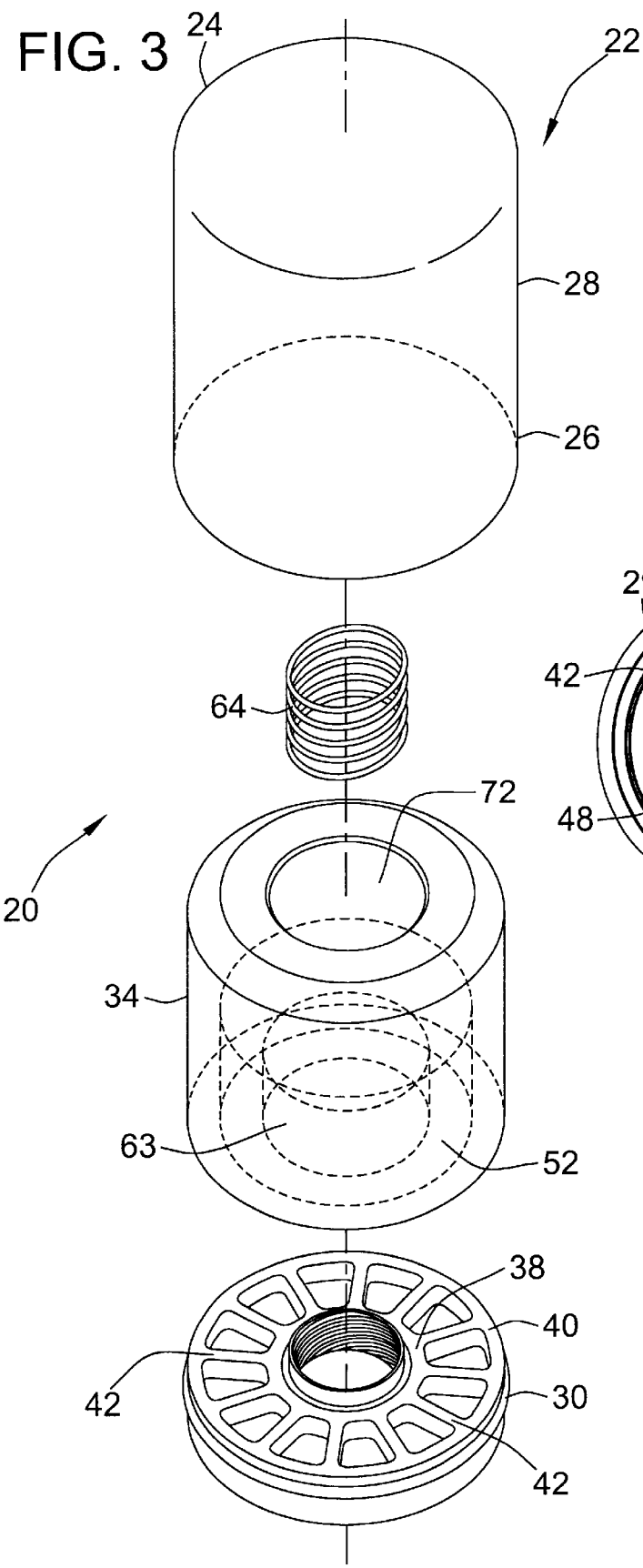
FIG. 3 is an exploded perspective view of the mechanical components of the acid-neutralizing filter of FIG. 1.

In the present embodiment as seen also in FIG. 3, the base plate 30 is cast, preferably from aluminum material, to include a central hub 38 and an outer peripheral rim 40 joined to the hub 38 by a plurality of ribs 42. Alternatively, the central hub 38 may be formed from any other suitable material depending on the desired working pressures and service conditions. The central hub 38 provides threads 44 such that the acid-neutralizing canister 20 is of the spin-on type capable of being threadingly connected to an oil system circuit. The hub 38 provides a central opening which in the present embodiment serves as a central outlet port 46 for returning de-acidified oil to the circulation system. Radially about the hub 38 and between the ribs 42, there is provided a plurality of openings which in the present embodiment serve as inlet ports 48 for receiving oil. The strength of the base plate 30 is preferably controlled by adjusting the number, size, width and length of the ribs 42.

The base plate 30 is secured to the canister 22 by hemming the free end 31 of the canister sidewall 28 over the base plate 30 to form a mechanical lock between the base plate 30 and the canister 22. The hemming operation does not require complex deformation of the sheet steel of the canister 22 and therefore heavier than normal gauge steel can be used to provide the desired strength requirements while maintaining a secure connection between the base plate 30 and the canister 22. This improves the strength and integrity of the acid-neutralizing canister 20 where failures in the canister or connection between the base plate and seaming lid can be catastrophic. In the currently preferred embodiment, the free end 31 is deformed radially inward over an annular support shoulder 33 and into a groove 35 which receives the hemming tool and allows the free end to be compressed against the inner peripheral surface of the shoulder 33. A groove 86 may be provided in the base plate 30 for receiving an inner gasket seal 27 which is compressed against the canister 22 to prevent fluid escape between the canister 22 and the base plate 30. An outer gasket groove 29 is also provided in the base plate 30 for receiving an outer o-ring gasket 37 which provides a sealing function between the acid-neutralizing canister 20 and a mounting surface of the oil circulation system to which the acid-neutralizing canister 20 connects.

Figure 4:
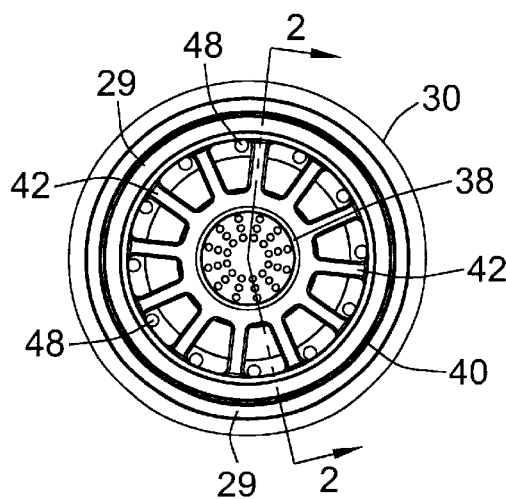
FIG. 4 is an end view of the end plate of the acid-neutralizing filter of FIG. 1.

The base plate 30 and the canister 22 generally house an inner shell as seen also in FIGS. 2 and 4 in the preferred form of a molded plastic inner shell 34 where plastic materials can provide suitable strength. More preferably, the inner shell 34 is formed from 20 gauge steel to provide greater strength and reliability. The inner shell 34 contains an acid-neutralizing compound 36 to neutralize the acids found, for instance, in oil in oil circulation systems. Preferably, the acid-neutralizing compound is calcium carbonate which is preferably in the form of crushed limestone as this is a low cost, highly effective acid neutralizer.

Crushed limestone suitable for use in the acid-neutralizing filter of the present invention is available from Iowa Limestone under the tradenames Unical S and Unical F, by Franklin Industrial Mining under the designations C6×16 and C8×12, and by Great Lakes Mining under the designations 20×200 and 12×40. Table A, set forth below, illustrates the standard sieve properties of these products. In addition, other suitable acid-neutralizing products which may be used in the acid-neutralizing inner shell 34 include amorphous magnesium carbonate and amorphous calcium carbonate. The smaller the acid-neutralizing compound particles, generally, the greater the surface area of the compound that is exposed to the fluid to be treated. The use of smaller particles thus increases the effectiveness of the treatment. The use of smaller particles also increases the pressure drop through the acid-neutralizing compound container. Therefore, the size of the particles selected should be balanced against the amount of pressure drop that can be tolerated across the container. Also, the degree of packing in combination with the particle size will impact both the amount of oil which may be moved through the acid-neutralizing canister as well as the materials used to construct the canister and its various components.

TABLE A

LIMESTONE SPECIFICATIONS

| Company | Grade | U.S. Screen Number | % Passing Screen |
|---|---|---|---|
| Iowa Limestone | Unical S | 25 | 100 |
|  |  | 45 | 98.5 |
|  |  | 70 | 68 |
|  |  | 100 | 44.5 |
|  |  | 200 | 12.5 |
|  | Unical F | 8 | 90 |
|  |  | 16 | 9.5 |
|  |  | 25 | 2.5 |
|  |  | 45 | 1.5 |
| Franklin Industrial Min | C6 × 16 | 4 | 100 |
|  |  | 5 | 99.54 |
|  |  | 6 | 97.28 |
|  |  | 7 | 71.33 |
|  |  | 8 | 35.57 |
|  |  | 10 | 11.65 |
|  |  | 12 | 5.45 |
|  |  | 16 | 2.7 |
|  | C8 × 12 | 8 | 90 |
|  |  | 16 | 9.5 |
|  |  | 25 | 2.5 |
|  |  | 45 | 1.5 |
| Great Lakes | 20 × 200 | 6 | 100 |
|  |  | 12 | 100 |
|  |  | 20 | 100 |
|  |  | 40 | 65 |
|  |  | 60 | 31 |
|  |  | 100 | 14 |
|  |  | 200 | 7 |
|  | 12 × 40 | 6 | 100 |
|  |  | 8 | 100 |
|  |  | 20 | 39 |
|  |  | 40 | 6 |
|  |  | 60 | 1 |
|  |  | 100 | 1 |

A typical analysis of a commonly available crushed limestone product is set forth in Table B:

TABLE B

Great Lakes
Limestone Chemical Composition

| Compound | % of Sample |
|---|---|
| Calcium Carbonate | 98.2 |
| Magnesium Carbonate | 1.36 |
| Silica | 0.23 |
| Aluminum | 0.08 |
| Iron | 0.13 |
| Sulfur | 0.06 |
| Total Available Carbonate | 99.54 |

Figure 5:
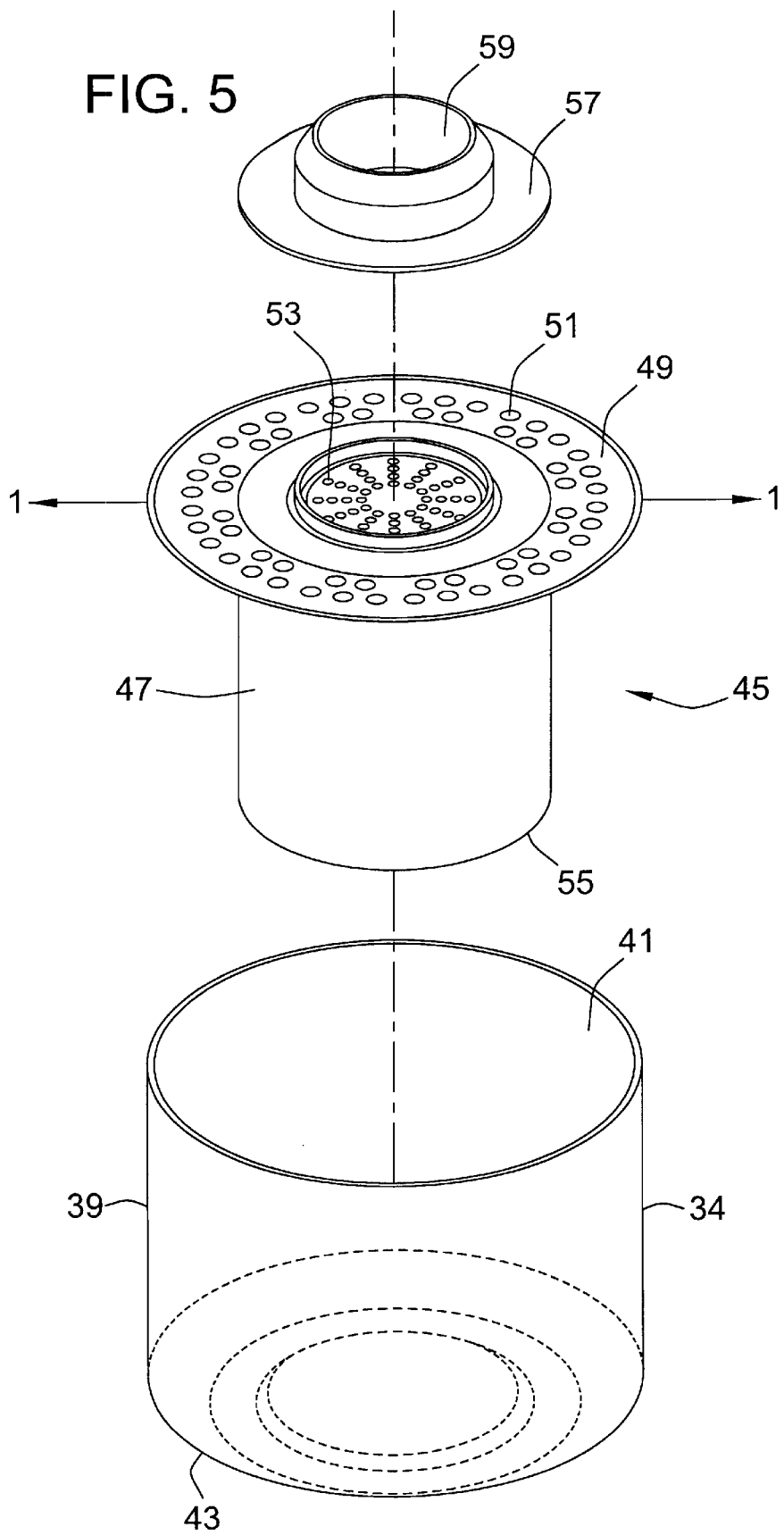
FIG. 5 is an exploded view of the mechanical components of the internal canister of the acid-neutralizing filter illustrated in FIG. 1 of the invention.

Referring to FIGS. 2 and 5, the inner shell 34 includes a substantially cylindrical sidewall 39 having an open end 41 and a substantially closed end 43. A combination flow baffle and end cap 45 is provided. Preferably, the combination flow baffle and end plate 45 is of a one-piece molded plastic configuration. The flow baffle portion 47 consists of a length of cylindrical tube of sufficient length to extend from the open end of the canister 34 to within about 1″ of the interior side of the closed end 43 of the canister 34. The end plate portion 49 includes an exterior ring 51 of apertures and a second set of centrally located apertures 53. ports covered with an insert molded screening material 207 and 209. Generally, the screening material is sized to prevent the acid-neutralizing compound from escaping from the container. Likewise, the inlet and outlet ports may be sized to prevent such escape. Port sizes are also impacted by the pressure drop allowed through the container. Preferably, the screening material has openings having a diameter of about 0.005″ to about 0.001″. In this matter, oil flows into the canister 39 through the exterior apertures 51, around the end 55 of the flow baffle portion 47 and out the central apertures 53 all while flowing through and contacting the acid-neutralizing compound 36 such as calcium carbonate.

In practice, the inner shell 34 is filled with the desired acid-neutralizing compound 36, e.g. calcium carbonate, for instance from a hopper by gravity into canister. The open end 41 of the inner shell 34 is filled with the desired acid-neutralizing compound 36. Once the acid-neutralizing compound container is filled with the acid-neutralizing compound, the baffle assembly is pushed down into the compound until it is in position to be crimped into the shell. The open end 41 of the inner shell 34 is then sealed or crimped against the end plate portion 49 to effect a seal between the inner shell 34 and the end plate portion.

As seen in FIG. 3, the acid-neutralizing canister 20 is assembled by inserting a spring 64 into the outer canister 22. The spring 64 must have sufficient winds and be of sufficient strength to maintain a pressure on the inner shell to maintain the packed conformation of the acid-neutralizing compound to prevent powdering of the compound. The spring 64 rests in the center of the inside of the closed end of the outer canister 22 and in a dimple 72 in the outer side of the closed end of the inner shell 34. The spring 64 is compressed during the insertion of the base plate 30 to maintain the desired pressure on the contents of the inner shell. The base plate 30 is then hemmed to the outer canister 22.

In normal engine operation, a bypass filter circulation loop is often provided as a part of the oil circulation system. The acid-neutralizing canister 20 may take the place of a standard bypass filter by simply spinning the acid-neutralizing canister 20 onto the bypass stub. In this manner, only a portion of the flow of the oil circulation system passes through the acid-neutralizing canister 20. After acid-neutralization, the fluid may flow through a typical particulate filter to guard against passage of acid-neutralizing compound 36 into the fluid circulation system. Alternatively, a second partial flow or full flow stub may be fitted into the oil circulation system. Where a full-flow stub is available, 100% of the oil flow will pass through the acid-neutralizing canister 20. In this situation, additional pressure may be required to operate the oil circulation system depending upon the pressure drop across the acid-neutralizing canister.

During normal operation, some percentage of used oil, preferably at least from about 5% to about 15% and alternatively up to 100% of the full flow of the oil circulation system flows into the acid-neutralizing canister 20 through the inlet ports 48, through a plurality of axial passageways 51 and into the inner shell 34. The fluid directed axially through the bed of the acid-neutralizing compound 36 around the end 55 of the baffle, through the remainder of the acid-neutralizing compound 36, through the outlet holes 53 and to the outlet port 46. It will be understood that the terms outlet and inlet ports refer to the manner at which used oil flows through the acid-neutralizing canister 20. More or less fluid can be passed through the filter and the direction of flow of the fluid through the canister can be in the reverse direction to that set forth above.

Although a single pass through the carbonate bed is shown, it will also be appreciated that the novel aspects of the present invention can also be incorporated into a multiple pass type canister through a series of baffles.

Figure 6:
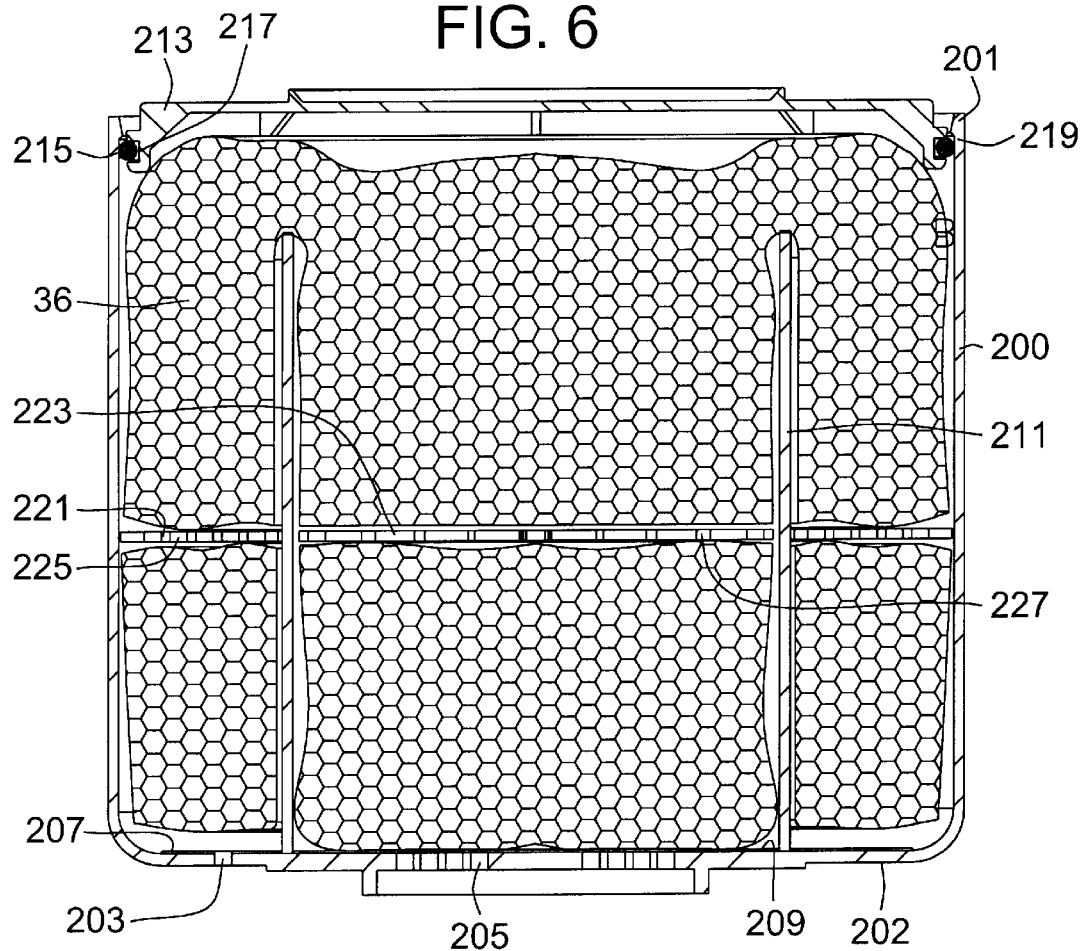
FIG. 6 is a cross-sectional view of an alternative embodiment of the acid-neutralizing canister components of the acid-neutralizing filter of the invention.

A first alternative acid-neutralizing compound container is illustrated in FIG. 6. This alternative container comprises a molded nylon main body 200 having an open end 201 and a partially closed end 202. The partially closed end includes inlet 203 and exit 205 ports covered with an insert molded screening material 207 and 209. Generally, the screening material is sized to prevent the acid-neutralizing compound from escaping from the container. Likewise, the inlet and outlet ports may be sized to prevent such escape. Port sizes are also impacted by the pressure drop allowed through the container. Preferably, the screening material has openings having a diameter of about 0.005" to about 0.001". Preferably, the inlet ports have diameters of from about 0.06" to about 0.25". Preferably, the outlet ports have diameters of from about 0.06" to about 0.25". The baffle 211 separating the inlet and outlet ports is molded into the housing and preferably has a generally tubular shape.

A lid 213 is fit onto the top open end of the housing. The lid is provided with an o-ring 215 which is seated in a u-shaped channel 217 which extends around the periphery of the lid. The lid is sealed to the housing by snapping the o-ring 215 past an undercut 219 in the housing wall. This alternative container allows two flow distributing plates 221 and 223 to be dropped into the housing during assembly. The distribution plates each have flow ports 225 and 227 to permit the fluid being neutralized to be more evenly distributed over the compound surfaces and prevent flow channeling. Preferably these ports have diameters of from about 0.03" to about 0.09". The acid-neutralizing compound 36, such as calcium carbonate, is located around the baffles within the container.

This alternative acid-neutralizing compound container is assembled by first filling the shell about half full with the acid-neutralizing compound 36. The two flow distributing plates are then dropped into each concentric flow path. The remaining volume of the container is then filled with the acid-neutralizing compound. The lid is then snapped into place by pushing the lid o-ring past the housing snap to form the finished assembly.

An alternative embodiment of the acid-neutralizing filter of the present invention is illustrated in FIGS. 7–10. The acid-neutralizing filter is generally comprised of a container 300, an acid-neutralizing shell 305, a spring 311 and a combination base plate and seaming lid 313. The container 300 is preferably formed from steel, aluminum or a moldable plastic material such as nylon and includes an open end 314, side walls 315 and a closed end 316.

The acid-neutralizing shell 305 includes partially closed end 309, an open end 312, a central conduit 317, a particulate filter 319, an end cap 321 and an acid-neutralizing compound 324. The acid-neutralizing shell 305 is preferably formed from steel, aluminum or a moldable plastic material such a nylon. The partially closed end 309 includes inlet ports 330 and a central opening 331 through which the treated and filtered fluid exits the assembly.

Located centrally in the acid-neutralizing shell 305 is a central conduit 317. The conduit 317 has a closed end 332 and an open end 335. Near the open end 335, the conduit 317 preferably flares 337 to a diameter approximating the size of the central opening in the shell 305. Near the closed end 332 of conduit 317, inlet ports 339 permit fluid to enter the conduit. Preferably, the conduit 317 has an exterior shoulder 341 encircling the conduit at an appropriate location between the open end 332 of the conduit 317 and the inlet ports 339, and preferably nearer to the closed end of the conduit than to the open end of the conduit. This shoulder 341 permits effective placement of the particulate filter 319 while insuring usage of the entire column of acid-neutralizing compound.

The particulate filter 319 is designed to prevent particles of the acid-neutralizing compound from entering the fluid circulation system. The particulate filter 319 includes filter media 361 wrapped around a perforated inner support 363 in a circular arrangement and in sealing engagement with first and second end caps 367 and 375. Optionally, the exterior of the particulate filter media 361 may also be surrounded by a perforated exterior support tube (not shown). Where an exterior support tube is used, it too is sealingly engaged by the first and second filter end caps 367 and 375.

The particulate media 361 is composed of a material and designed so as to permit filtering of particulates from the fluid entering the filter. The media 361 may be formed from any suitable filter media. Examples of suitable filter media include cellulose, synthetic fiber, or micro-glass Preferably, the particulate media 361 is formed from micro-glass, synthetic fiber or other synthetic media. Also, preferably, the particulate media 361 is wrapped with a pre-filter comprising a synthetic porous material made of polyester or nylon or a wire mesh material made of stainless steel, having openings preferably of from about 0.0005" to about 0.001" to prevent the acid-neutralizing compound from invading the gaps between the pleats of the filter media.

One end 381 of the particulate filter 319 is sealingly engaged in a u-shaped channel formed within the interior end of the particulate filter first end cap 367. The first end cap 367 is in the form of a u-shaped cap into which the ends of perforated inner support 363 and the particulate filter media 361 fit. The first end cap 367 includes a central opening through which the conduit 316 may pass. The particulate filter first end cap 367 also includes an inward facing u-shaped channel 371 which holds an o-ring 373 which can engage and seal the particulate filter against the outer circumference of the conduit 316.

The particulate filter second end cap 375 is also u-shaped and has a central opening which sealingly engages the top of the perforated inner support 363 as well as the filter media 361. In a like manner to the first end cap 367, the particulate filter second end cap 375 also includes an inward facing u-shaped channel 381 which holds an o-ring 383 which can engage and seal the particulate filter against the outer circumference of the conduit 316.

The end caps including the inward facing u-shaped channels are preferably formed from two components, preferably each formed from a metal such as steel. Alternatively, other materials where suitable, such as plastics, may be used. The first component includes a first horizontal inward facing shoulder 385, 387 which is integrally formed with and extends from the inner vertical u-channel wall 389, 390. The outer side of the inner u-channel wall 389, 390 preferably forms much of the bottom of the inward facing u-shaped channels 371 and 381. The inner u-channel wall then transitions to an outward oriented horizontal extension 391 and 393 which preferably engages at least a portion of the end of the filter media 361. A second component is preferably provided to form the second exterior vertical wall and a portion of the bottom of the inward facing u-shaped channels. The second component includes an inward facing horizontal shoulder 392 and 394 forming the second wall of the inward facing u-shaped channels, a vertical wall 395 and 397 forming a portion of the bottom of the inward facing u-shaped channels, a further horizontal outward extending wall 399 and 401, a step 402, 404 a second horizontal wall 405, 406, and the vertical outer wall 407 and 408 of the u-shaped channel engaging the filter media 361.

The outward oriented horizontal extension 391 and 393 is used to join the first component to the second component second horizontal wall 405, 406 by glue, heat welding or spot welding. The steps 402, 404 permits the first and second components to be joined such that a uniform interior surface is presented to the filter media to facilitate the seal formed between the assembled end cap and the filter media. The assembled end caps 367 and 375 are then sealingly engaged with the filter media and perforated support tube using potting material such as plastisol or by epoxy.

During assembly, the open end 335, preferably the flared open end 337, of the conduit 316 is inserted into the open end 309 of the shell 305. The conduit 316 is then ultrasonically welded, spin welded, potted or otherwise sealingly engaged with a shoulder extending inward from the central opening 331 of the partially closed end 337 of the shell 305. The space between the inner wall of the shell 305 and the outer wall of the conduit is then filled with the acid-neutralizing compound up to the shoulder 341 on the exterior of the conduit 316. The particulate filter 319 is slipped over the conduit 316 and seated against the exterior conduit shoulder 341. The remaining void space within the shell 305 is then filled with the acid-neutralizing compound. The end cap 321 is then used to seal the open end 309 of the shell 305. The end cap 321 is provided with an o-ring 415 which is seated in a u-shaped channel 417 which extends around the periphery of the end cap. The end cap 321 is sealed to the shell by snapping the o-ring 415 past an undercut 419 in the housing wall. As with the other assemblies discussed above, the degree of packing of the acid-neutralizing compound and the particle size will determine both the amount of oil which may be moved through the acid-neutralizing filter as well as the materials used to construct the filter and its various components.

Once the acid-neutralizing filter is assembled, the filtering apparatus is ready to be completed. A coiled spring 311 is inserted into the container 300. The spring 311 is preferably a coil spring formed from steel and has a spring force of about 35 to about 50 psi.

Next, the completed acid-neutralizing shell 305 is inserted into the container 300. The spring 311 seats between the inside of the closed end of container 300 and a depression 420 on the exterior of the end cap 321. A base plate adapter seal 443 is then provided to effect a seal between the acid-neutralizing shell 305 and the base plate/seaming lid assembly. The base plate adapter seal 443 is preferably formed from nitrile or another suitable rubber compound. The seal 443 includes a first lip 444, a body portion 445, and a second lip 446. The body portion engages the flat portion of the partially closed end 309 of the shell 305 and a portion of the base plate 451 while the first lip engages the inner wall of the container central opening 29.

A base plate\seaming lid assembly 313 is then required to complete the assembly. The base plate 451 includes a conventional threaded passage 455 which engages the threads on the apparatus post (not shown). The base plate 451 also comprises a slanting first wall segment 459 which includes inlet ports 461, through which the fluid to be filtered passes, and an upturned internally threaded segment 455 which is suitable for engaging an oil inlet post (not shown). Preferably, the inlet ports 461 are arranged angularly in a circular array around the perimeter of the threaded passage 455 and are located within the slanted first wall segment 459 of the base plate.

Inlet fluid enters through the inlet ports 461 and the base plate adapter seal 443 prevents this inlet fluid from bypassing the filters and returning directly to the engine without filtration. The base plate 451 also includes a transition section 465 that extends outward from the slanted first wall segment 459 above the inlet ports 461. The base plate 451 further comprises an outer rim 467, which is attached to the outermost portion of the transition section 465 and is positioned adjacent the outer open end of the container 300.

A seaming lid 475 is then attached to the base plate 451 and to the open end of the container 300. The seaming lid 475 preferably comprises a circular ring having an interior circular groove 477 that consists of an u-shaped channel with its open end facing towards the open end of the container 300, and a downward turn outer rim 479 that surrounds the exterior of the seaming lid and protrudes beyond the periphery of both the base plate 451 and the container 300. Preferably, the seaming lid 475 is applied by placing the bottom side of the portion of the seaming lid that forms the circular groove 477 within the outer rim 467 of the base plate, and welding the bottom side of the seaming lid at the circular groove 477 to the transition section 465 of the base plate. Preferably, this welding of the base plate 451 and seaming lid 475 occurs before sealing the filter.

A circular seal 482 is placed within the circular groove 481. The circular seal 482 engages the apparatus, such as an engine, to effect a seal to prevent leakage of the outlet fluid passing from the apparatus to the filter. The circular seal 482 may take the form of any of such well-known seals (e.g., a gasket) and preferably is smooth on the exterior surface. Preferably, the circular seal 482 is in the form of a flat seal that includes an undercut portion that fits within the circular groove 481 which assists in holding the circular seal 482 in place.

Figure 7:
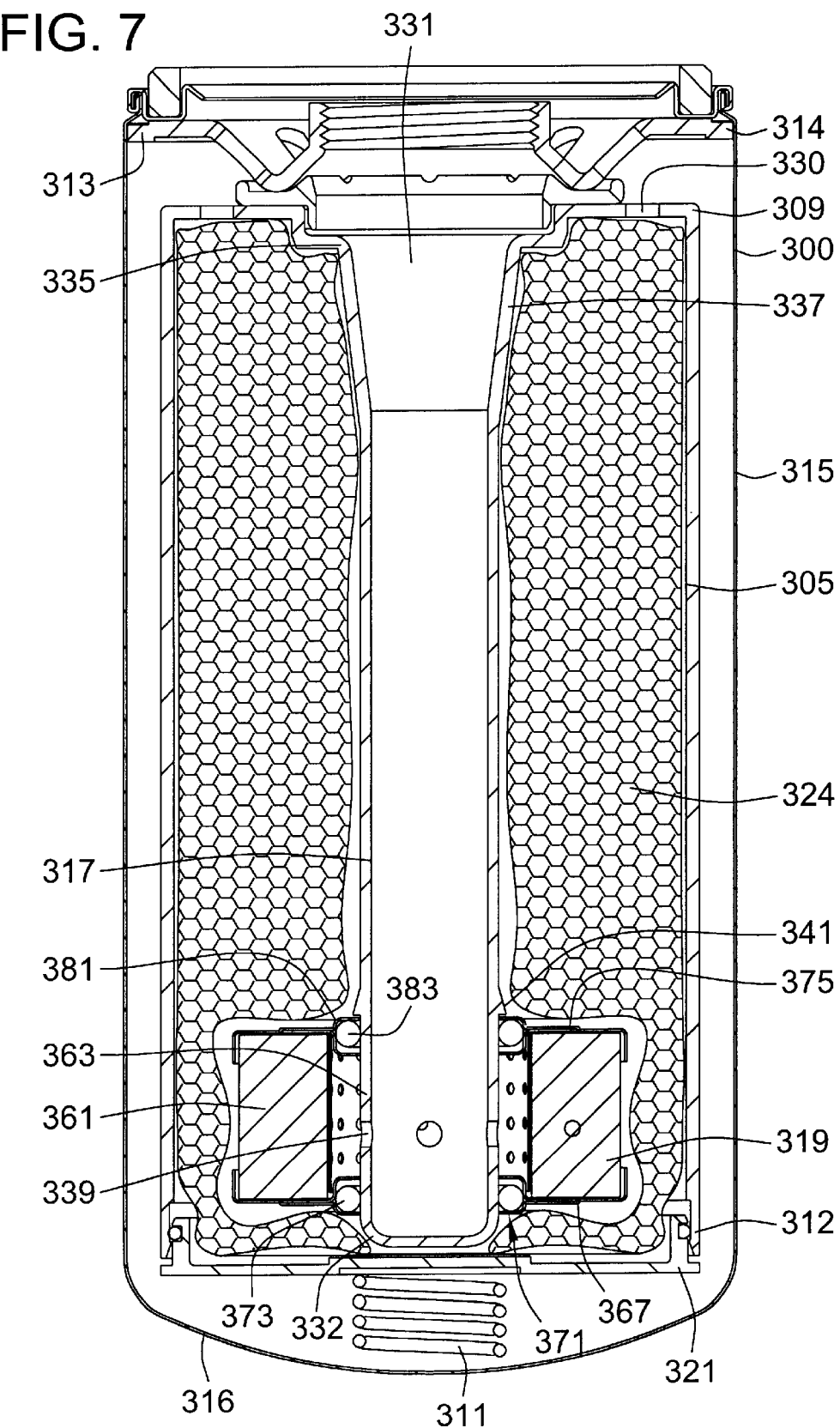
FIG. 7 is a cross-sectional view of an alternative acid-neutralizing filter constructed according to the present invention.
Figure 8A:
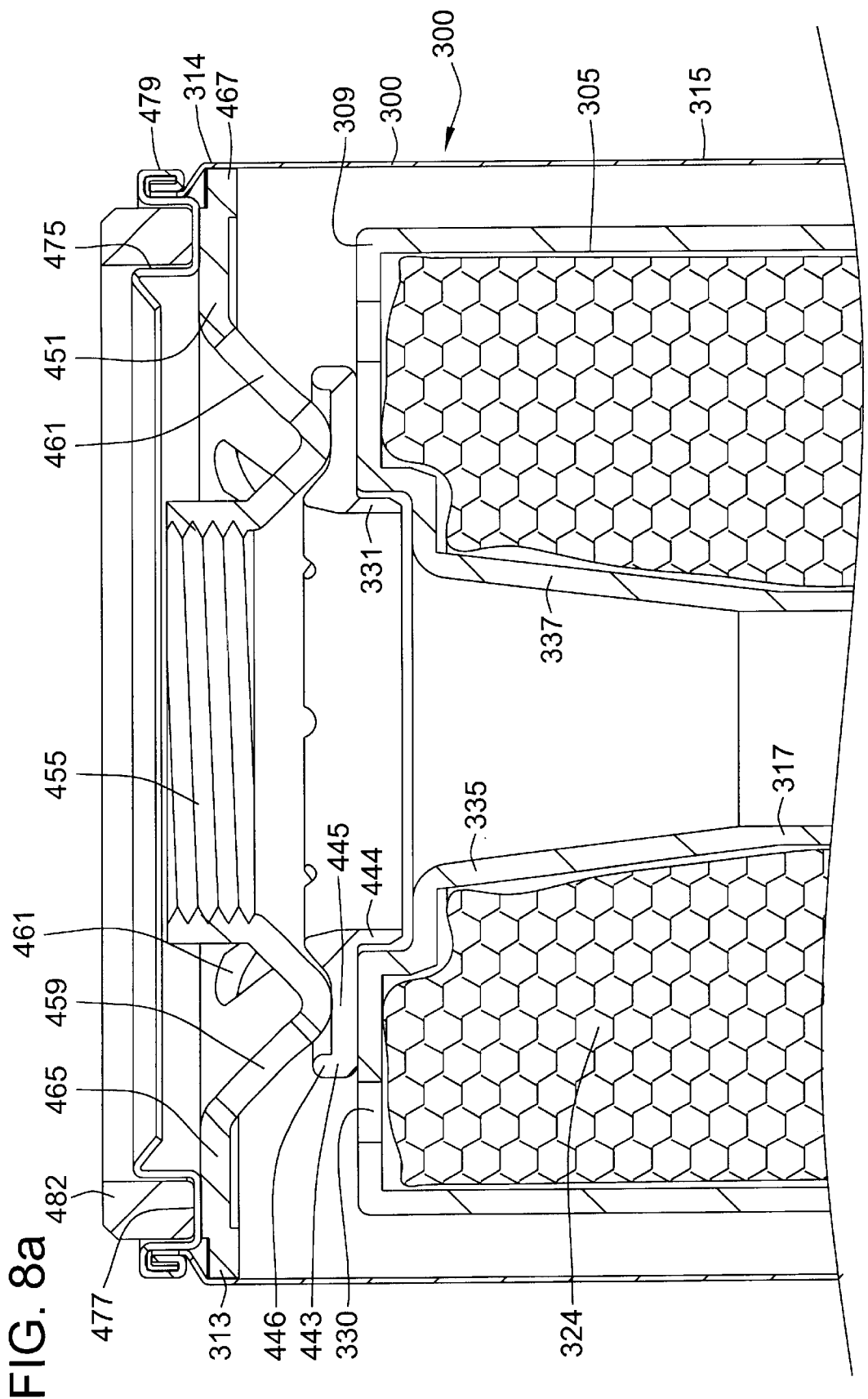
FIG. 8a is a cross-sectional view of the upper portion of the filter of FIG. 7.
Figure 8B:
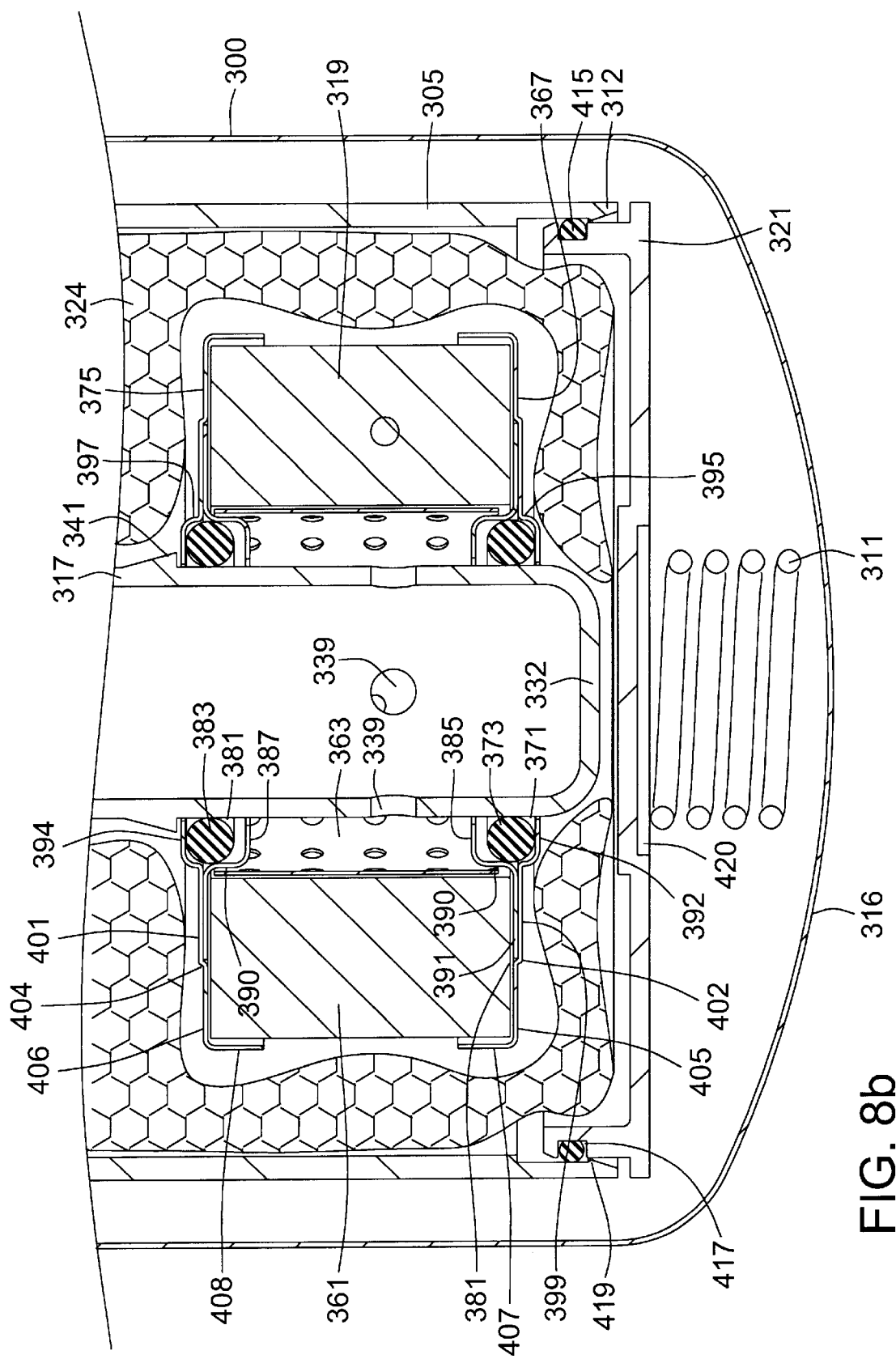
FIG. 8b is a cross-sectional view of the lower portion of the filter of FIG. 7.

The seaming lid 475, preferably welded to the base plate 451 as described above, is applied to the filter of the present invention, compressing the spring 311. As seen in FIGS. 7–9, the outer rim of the seaming lid, which is elevated above the circular groove 481, and which extends beyond the periphery of the base plate 451 and the container 300, forms a channel into which the periphery of the open end of the container 300 can fit. Preferably, the container 300 further comprises a slightly overturned outer lip (not shown) that extends beyond the periphery of the container 300. When the elements of the filter apparatus are assembled as described above, the outer rim 490 of the seaming lid and the outer lip of the housing are subsequently turned over (crimped) thereby sealing the contents of the filter within the container 300.

During attachment of the base plate\seaming lid assembly, the spring 311 is compressed between the interior of the closed end of the container 300 and the depression 420 on the exterior of the end cap of the acid-neutralizing shell 305.

After the filter assembly is prepared, the fluid such as oil enters through the base plate inlet ports and then enters the acid-neutralizing shell 305 through the inlet ports 330. The fluid passes through the acid-neutralizing compound where the acids in the fluid are neutralized. The oil then flows through any pre-filter, the particulate filter media, through the perforated support screen, and through the conduit inlet ports. Once in the conduit, the treated and filtered fluid passes through the conduit, out the central opening of the acid-neutralizing shell 305 and out the base plate central outlet. In this manner, any particulates carried in the fluid, such a particles of the acid-neutralizing compound, are removed from the fluid before the fluid re-enters the fluid circulation system. Should such particulates enter a fluid circulation system such as an oil system on a diesel engine, the particulates could damage the engine.

All of the references cited herein, including patents, patent applications and publications are hereby incorporated in their entireties by reference. While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and the scope of the invention as defined by the following claims.

All of the references cited herein, including patents, patent applications, and publications, are hereby incorporated in their entireties by reference.

While this invention has been described with an emphasis upon preferred embodiments, variations of the preferred embodiments can be used, and it is intended that the invention can be practiced otherwise than as specifically described herein. Accordingly, this invention includes all modifications encompassed within the spirit and scope of the invention as defined by the claims.

What is claimed is:

1. An oil circulation system which enables extended intervals between oil changes comprising:
   a canister;
   an inner shell inside the canister, the inner shell comprising a substantially impervious body having an inlet port and an outlet port;
   an acid-neutralizing compound contained within the inner shell;
   an oil passageway through the acid-neutralizing compound in the shell from the inlet port to the outlet port, the substantially impervious shell imparting substantial radial and axial components to the oil passageway;
   a particulate filter downstream of the acid neutralizing compound; and
   wherein a portion or all of the oil in the oil circulation system passes first through the acid-neutralizing compound and then through the particulate filter.

2. The oil circulation system of claim 1, wherein the particulate filter is located within a second canister.

3. The oil circulation system of claim 1, wherein the particulate filter is located within the inner shell.

4. The oil circulation system of claim 3, wherein the particulate filter is positioned in a concentric relationship around an inner conduit.

5. The oil circulation system of claim 4, wherein the acid-neutralizing compound is positioned at least in part in a concentric relationship around the particulate filter.

6. The oil circulation system of claim 5, wherein the particulate filter includes first and second end caps sealingly engaging filter media trapped between the end caps and wherein each end cap includes an inward facing u-shaped channel adapted to receive a seal.

7. The oil circulation system of claim 6, wherein the seals are o-ring seals and wherein the seals effect a seal between the particulate filter and the inner conduit, and wherein the conduit includes one or more inlet ports passing through the wall of the conduit in an area encompassed between the seals.

8. The oil circulation system of claim 1, wherein the inner shell including at least one baffle to lengthen the circulation path through the acid-neutralizing compound.

9. The oil circulation system of claim 1, wherein the acid-neutralizing compound is selected from the group consisting of crushed limestone, calcium carbonate and magnesium carbonate.

10. The oil circulation system of claim 1, wherein the particulate filter includes filter media which is surrounded by a pre-filter.

11. The oil circulation system of claim 1, further comprising a combination flow baffle and end cap for engaging the inner shell.

12. The oil circulation system of claim 11, wherein the combination flow baffle and end cap includes inlet and outlet ports and wherein a molded screen material covers the inlet and outlet ports to prevent acid-neutralizing compound from exiting the inner shell.

13. An acid-neutralizing apparatus comprising:
    a shell having a closed end and an open end;
    an acid-neutralizing compound contained within the shell;
    a baffle contained within the shell;
    a combination flow baffle and end cap for engaging the open end of the shell,
    wherein the flow baffle of the combination flow baffle and end cap lengthens the flow path of fluid passing through the apparatus, and
    wherein the combination flow baffle and end cap includes inlet and outlet ports which are covered by a screen material to prevent acid-neutralizing compound from exiting the inner shell.

14. An acid-neutralizing canister for an oil circulation system, comprising:
    a base plate;
    a canister;
    an inner shell, the inner shell comprising a substantially impervious body having an inlet port and an outlet port;
    an acid-neutralizing compound in the inner shell for neutralizing acids in the oil circulated through the inner shell; and
    an oil passageway through the acid-neutralizing compound in the shell from the inlet port to the outlet port, the substantially impervious shell imparting substantial radial and axial components to the oil passageway.

15. The acid-neutralizing canister of claim 14, wherein the base plate includes a central hub, an outer peripheral rim surrounding the hub, and a plurality of radially extending ribs connecting the hub and the rim, the central hub defining a threaded central opening for spin-on connection to the oil system.

16. The acid neutralizing canister of claim 15, wherein the central threaded opening of the base plate provides a central port for fluid returning to the oil circulation system and wherein a plurality of peripheral ports defined between the hub, the ribs and the peripheral rim provide for fluid entering the filter from the oil circulation system.

17. The acid neutralizing canister of claim 14, wherein the acid-neutralizing compound is selected from the group consisting of crushed limestone, calcium carbonate, and magnesium carbonate.

18. The acid neutralizing canister of claim 14, wherein the:
the acid-neutralizing compound substantially fills the inner shell; and
an oil passageway through the inner shell including a first flow passage through the acid-neutralizing compound in a first axial direction, and a second flow passage through the acid-neutralizing compound in a second axial direction.

19. The acid neutralizing canister of claim 18, wherein the in inner shell further includes flow distribution inserts to evenly distribute the oil across the acid-neutralizing compound.

20. The acid neutralizing canister of claim 18, wherein the acid-neutralizing compound is selected from the group consisting of crushed limestone, calcium carbonate, and magnesium carbonate.

21. The acid neutralizing canister of claim 18, wherein the first and second flow passages are established by a baffle plate which is slidable into the inner shell.

22. The acid neutralizing canister of claim 20, further comprising a spring for maintaining the inner shell contents under compression.

23. The acid neutralizing canister of claim 14, wherein the acid-neutralizing compound is selected from the group consisting of crushed limestone, calcium carbonate, and magnesium carbonate.

24. The acid neutralizing canister of claim 23 wherein the oil to be neutralized passes through the acid-neutralizing compound in a first axial direction, the oil then passes around the end of a baffle and then flows through the compound in an opposite axial direction.

25. The acid neutralizing canister of claim 23, wherein the inner shell further includes flow distribution inserts to evenly distribute the oil across the carbonate medium.

26. A replaceable acid-neutralizing canister for an oil circulation system, comprising:
a housing;
an inner shell, the inner shell comprising a substantially impervious body having an inlet port and an outlet port;
an acid-neutralizing compound contained within an inner shell positioned in the housing adapted to neutralize acids in the oil flowing through the compound;
an oil passageway through the acid-neutralizing compound in the shell from the inlet port to the outlet port, the substantially impervious shell imparting substantial radial and axial components to the oil passageway; and
a particulate filter through which the acid-neutralized oil passes prior to returning to the oil circulation system, the particulate filter being contained within the inner shell.

27. The replaceable acid-neutralizing canister of claim 26, wherein the particulate filter includes first and second end-caps sealingly engaging filter media trapped between the end caps and wherein each end-cap includes an inward facing u-shaped channel adapted to receive an o-ring seal.

28. The replaceable acid-neutralizing canister of claim 27, wherein the o-rings effect a seal between the particulate filter and a central conduit which is surrounded by the particulate filter, and wherein the conduit includes one or more inlet ports passing through the wall of the conduit in an area encompassed between the o-rings.

29. An acid-neutralizing canister for an oil circulation system, comprising:
a housing including a canister and a base plate, the canister having an open end, a closed end, and a generally cylindrical sidewall therebetween, the base plate having a central threaded opening for mounting the acid-neutralizing canister to the oil circulation system about an axis, the base plate connected to the outer canister at the open end and defining inlet and outlet ports for communicating oil with the oil circulation system, one of the inlet or outlet ports being provided by the threaded opening;
an internal acid-neutralizing compound inner shell in the canister;
an acid-neutralizing compound substantially filling the inner shell, the inner shell adapted to receive oil and return oil;
the inner shell further containing a baffle defining an oil passageway such that the oil entering the inner shell flows through the acid-neutralizing compound in a first axial direction, and then flows in a second axial direction.

30. An acid-neutralizing canister for an oil circulation system, comprising:
an outer canister having an open end, a closed end, and a generally cylindrical sidewall therebetween;
base plate connected to the outer canister at the open end, the base plate defining a threaded central opening providing a central port and a plurality of peripheral ports;
inner shell including a base and a tubular sidewall extending from the base, the inner shell having a base proximate the base plate, the base including apertures in communication with the central port, the tubular sidewall being substantially impervious without perforations throughout the sidewall;
particulate acid-neutralizing compound substantially filling inner shell;
baffle plate slidable in the inner shell container;
spring positioned between the inner closed end of the outer canister and the outer closed end of the inner shell; and
oil passageway through the inner shell such that the oil flowing through the inner shell contacts the acid-neutralizing compound.

* * * * *